United States Patent
Race et al.

(10) Patent No.: US 10,900,380 B2
(45) Date of Patent: Jan. 26, 2021

(54) RECIRCULATION STALL IN COMPRESSOR INSERT OR BACKPLATE

(71) Applicant: BorgWarner Inc., Auburn Hills, MI (US)

(72) Inventors: Robert Thomas Race, Arden, NC (US); Erwin Perry Ellwood, III, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 365 days.

(21) Appl. No.: 15/840,799

(22) Filed: Dec. 13, 2017

(65) Prior Publication Data

US 2019/0178105 A1    Jun. 13, 2019

(51) Int. Cl.
| | | |
|---|---|---|
| *F01D 25/18* | (2006.01) | |
| *F02C 6/12* | (2006.01) | |
| *F01D 25/16* | (2006.01) | |
| *F04D 29/051* | (2006.01) | |

(52) U.S. Cl.
CPC .......... *F01D 25/183* (2013.01); *F01D 25/18* (2013.01); *F02C 6/12* (2013.01); *F01D 25/162* (2013.01); *F04D 29/0513* (2013.01); *F05D 2220/40* (2013.01); *F05D 2240/70* (2013.01); *F05D 2260/6022* (2013.01); *F05D 2260/98* (2013.01)

(58) Field of Classification Search
CPC ...... F01D 25/18; F01D 25/182; F01D 25/162; F02C 6/12; F16N 7/40; F16N 7/363; F16N 7/366; F16N 7/30; F04D 29/063
See application file for complete search history.

(56) References Cited

U.S. PATENT DOCUMENTS

| | | | |
|---|---|---|---|
| 4,142,608 | A | 3/1979 | Sarle |
| 4,480,440 | A | 11/1984 | Harper et al. |
| 4,664,605 | A | 5/1987 | Asano et al. |
| 9,540,950 | B2 | 1/2017 | Maniar |
| 2010/0132358 | A1 | 6/2010 | Purdey |
| 2013/0142679 | A1 | 6/2013 | Hornbach et al. |
| 2015/0176593 | A1 | 6/2015 | Dayalan et al. |
| 2016/0201727 | A1 | 7/2016 | Wild et al. |

FOREIGN PATENT DOCUMENTS

| | | |
|---|---|---|
| EP | 3392471 A2 | 10/2018 |
| JP | 2016-151274 A | 8/2016 |
| WO | WO 2013/106303 A1 | 7/2013 |
| WO | WO 2017/149671 A1 | 9/2017 |

OTHER PUBLICATIONS

International Search Report from counterpart Application No. PCT/US2018/065413; report dated Mar. 22, 2019.

*Primary Examiner* — Nathaniel Wiehe
*Assistant Examiner* — John S Hunter, Jr.
(74) *Attorney, Agent, or Firm* — von Briesen & Roper, S.C.

(57) ABSTRACT

In a turbocharger for receiving exhaust gas from an internal combustion engine and for delivering compressed air to the internal combustion engine, a backplate may include a lubricant stall protrusion, such as a rib, may be placed in recirculation or collection recesses of the backplate to stall recirculating lubricant flow and direct the lubricant into a bearing housing lubricant core and drain to reduce an amount of lubricant proximate piston rings and leaking into a compressor housing of the turbocharger. When an lubricant deflector is used, the lubricant stall protrusion stalls recirculating lubricant that is outboard of the lubricant deflector, and may have an outer protrusion edge closely matching the outboard contour of the lubricant deflector to minimize a flow gap there between.

20 Claims, 5 Drawing Sheets

RECIRCULATION STALL IN COMPRESSOR INSERT OR BACKPLATE

TECHNICAL FIELD

The present disclosure relates generally to turbochargers utilized to enhance internal combustion engine performance and, more particularly, to lubricant sealing in turbochargers.

BACKGROUND

Turbochargers are used to enhance performance of internal combustion engines. Turbochargers are typically centrifugal compressors driven by exhaust gas turbines that boost engine power, curtail emissions, and improve fuel economy. Rather than being belt-driven by the engine, as are superchargers, the typical turbocharger relies upon exhaust energy for its power, and as such is designed to rotate at speeds considerably higher than those of superchargers.

The challenges of satisfactorily lubricating turbochargers are well known by those skilled in the art. Normally, a single shaft connects an exhaust driven turbine wheel to a compressor wheel. The shaft is journaled within a pair of spaced sleeve bearings along its length, and includes a shoulder at the compressor wheel end configured to support a thrust bearing. At the thrust bearing end, an oil flinger and an oil deflector may be designed to work in concert to drive oil away from piston rings secured about the shaft by keeping the bulk of the oil on the thrust bearing side of the oil deflector. As such, lubrication oil sealing systems are generally designed to avoid any oil leakage past the piston rings; i.e. to reduce chances of oil entering the compressor section of the turbocharger.

Turbochargers can rotate at speeds in excess of 100,000 rpm. Numerous enhancements have been made to increase their longevity, particularly as related to issues of lubrication. For example, ceramic bearings have been used in some applications, while various improvements in oil circulation have been achieved in others. As packaging requirements have continued to reduce physical spaces allotted to under-the-hood components including turbochargers, however, additional modification related to oil flinger and oil deflector componentry may be necessary to assure continued effectiveness of turbocharger oil sealing systems.

SUMMARY OF THE DISCLOSURE

In one aspect of the present disclosure, a turbocharger for receiving exhaust gas from an internal combustion engine and for delivering compressed air to the internal combustion engine is disclosed. The turbocharger is lubricated by a lubricant. The turbocharger may include The turbocharger may include a compressor housing disposed about a longitudinal axis of the turbocharger and defining an inlet passage for receiving intake air; a bearing housing disposed about the longitudinal axis, wherein the bearing housing is coupled to the compressor housing and defines a lubricant core having a lubricant drain for collecting and draining the lubricant from the bearing housing, a turbocharger shaft extending through the compressor housing and the bearing housing and having a shaft rotational axis that is coincident with the longitudinal axis, and a backplate coupled between the compressor housing and the bearing housing. The backplate may include a shaft opening having the turbocharger shaft extending there through, a bearing housing engagement surface facing and engaging the bearing housing, a lubricant recirculation recess extending axially inward into the backplate from the bearing housing engagement surface, encircling the shaft opening, and in fluid communication with the lubricant drain, and a lubricant stall protrusion extending axially from the lubricant recirculation recess toward the bearing housing engagement surface. The lubricant stall protrusion engages the lubricant flowing in the lubricant recirculation recess such that the lubricant is redirected to the lubricant drain.

In another aspect of the present disclosure, a backplate for a turbocharger is disclosed. The turbocharger receives exhaust gas from an internal combustion engine and delivers compressed air to the internal combustion engine and is lubricated by a lubricant. The turbocharger includes a compressor housing defining an inlet passage for receiving intake air, a bearing housing coupled to the compressor housing and defining a lubricant core having a lubricant drain for collecting and draining the lubricant from the bearing housing, and a turbocharger shaft extending through the compressor housing and the bearing housing and having a shaft rotational axis that is coincident with a longitudinal axis of the bearing housing. At installation the backplate is coupled between the compressor housing and the bearing housing. The backplate may include a shaft opening having the turbocharger shaft extending there through, a bearing housing engagement surface that faces and engages the bearing housing when the backplate is installed in the turbocharger, a lubricant recirculation recess extending axially inward into the backplate from the bearing housing engagement surface and encircling the shaft opening, wherein the lubricant recirculation recess is in fluid communication with the lubricant drain when the backplate is installed in the turbocharger, and a lubricant stall protrusion extending axially from the lubricant recirculation recess toward the bearing housing engagement surface. The lubricant stall protrusion engages the lubricant flowing in the lubricant recirculation recess such that the lubricant is redirected to the lubricant drain.

In a further aspect of the present disclosure, a turbocharger for receiving exhaust gas from an internal combustion engine and for delivering compressed air to the internal combustion engine is disclosed. The turbocharger is lubricated by a lubricant. The turbocharger may include a compressor housing disposed about a longitudinal axis of the turbocharger and defining an inlet passage for receiving intake air, a bearing housing disposed about the longitudinal axis, wherein the bearing housing is coupled to the compressor housing and defines a lubricant core having a lubricant drain for collecting and draining the lubricant from the bearing housing, a turbocharger shaft extending through the compressor housing and the bearing housing and having a shaft rotational axis that is coincident with the longitudinal axis, a backplate coupled between the compressor housing and the bearing housing, and a lubricant deflector coupled between the bearing housing and the backplate. The backplate may include a shaft opening having the turbocharger shaft extending there through, a bearing housing engagement surface facing and engaging the bearing housing, a lubricant recirculation recess extending axially inward into the backplate from the bearing housing engagement surface, encircling the shaft opening, and in fluid communication with the lubricant drain, and a lubricant stall protrusion extending axially from the lubricant recirculation recess toward the bearing housing engagement surface. The lubricant stall protrusion engages the lubricant flowing in the lubricant recirculation recess such that the lubricant is redirected to the lubricant drain. The lubricant deflector may include a lubricant deflector channel encircling the turbocharger shaft and the shaft opening and opening toward the bearing housing to receive the lubricant from the bearing housing, and a lubricant deflector tongue extending from the lubricant deflector channel toward the lubricant drain. The lubricant deflector tongue engages the lubricant flowing in the lubricant deflector channel such that the lubricant is redirected to the lubricant drain.

These and additional aspects are defined by the claims of this patent.

DETAILED DESCRIPTION

Figure 1:
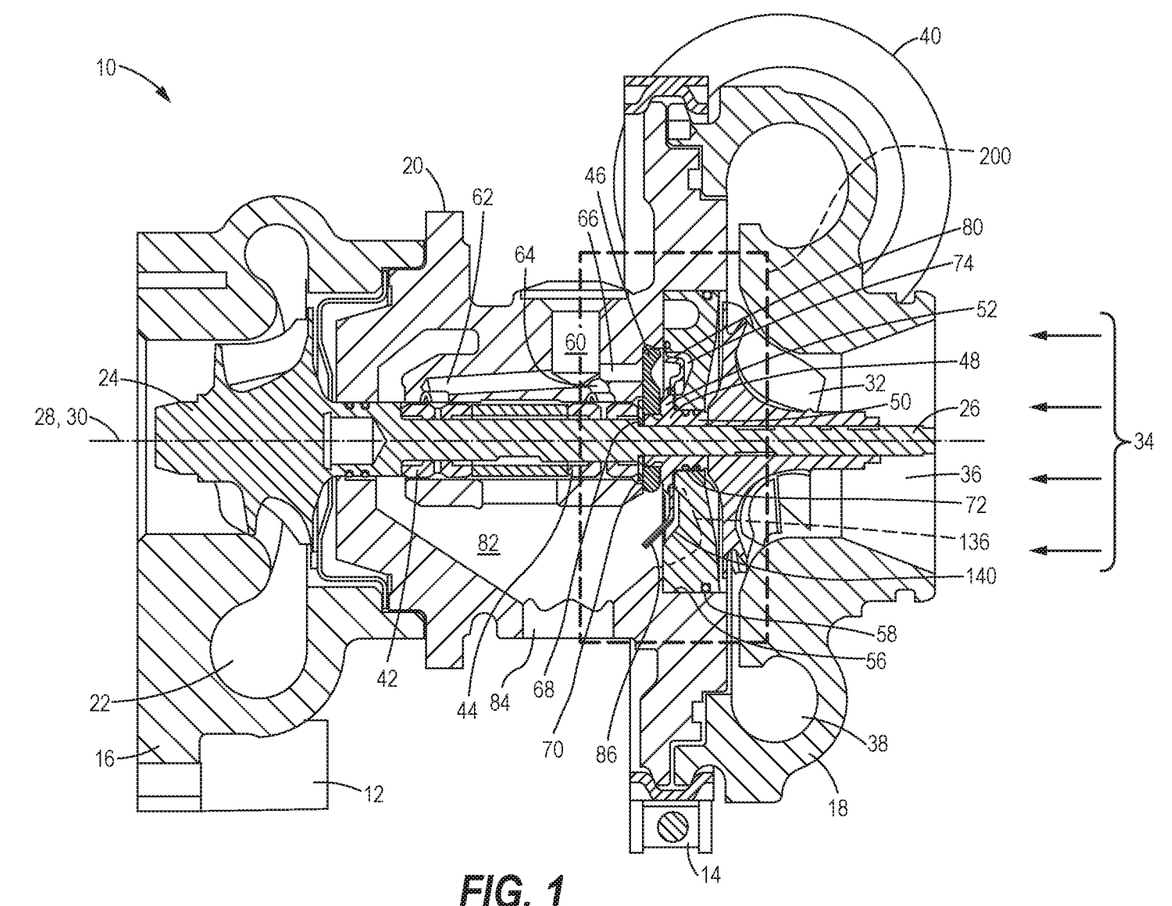
FIG. 1 is a side cross-sectional view of a turbocharger in which lubricant recirculation stall in accordance with the present disclosure may be implemented.

Referring to FIG. 1, a turbocharger 10 generally includes a mounting connector 12 and a V-band tie bolt 14 for securement to an associated engine (not shown). The turbocharger 10 includes a turbine housing 16 at one end, a compressor housing 18 at an opposite end, and a bearing housing 20 situated intermediately of, and bolted, clamped, banded or otherwise rigidly affixed or secured to each of, the turbine housing 16 and the compressor housing 18.

The turbine housing 16 includes passageways 22 for receiving high-energy exhaust gases from an engine manifold (not shown). Those skilled in the art will appreciate that the passageways 22 direct the exhaust gases to a turbine wheel 24 mounted for rotation within the turbine housing 16 as is conventional in the art of turbochargers. The turbine wheel 24 is fixedly secured to one end of a turbocharger shaft 26 that extends from the turbine housing 16 through the bearing housing 20 and into the compressor housing 18 with a shaft rotational axis 28 of the turbocharger shaft 26 aligned along a turbocharger longitudinal axis 30 of the turbocharger 10 that the housings 16, 18, 20 extend along and are disposed about when the turbocharger 10 is assembled as shown in FIG. 1. A compressor wheel 32 is secured to an opposite end of the turbocharger shaft 26 and disposed within the compressor housing 18. The compressor wheel 32 is configured to compress atmospheric air indicated by arrows 34 received into the compressor housing 18 through an intake air inlet passage 36. The atmospheric air 34 is compressed within an annular passageway 38 in conventional fashion prior to exiting to the engine (not shown) through a compressed air outlet 40. As such, those skilled in the art will appreciate that actual turbocharger power for compression of the atmospheric air 34 is initiated at the turbine wheel 24 that rotates the turbocharger shaft 26 via the energy of the noted exhaust gases received from the engine manifold at the passageways 22.

The turbocharger shaft 26 is supported by a pair of spaced sleeve or journal bearings 42, 44 for rotation about the shaft rotational axis 28. Within the bearing housing 20 near its interface with the compressor housing 18, a radially oriented thrust bearing 46 is configured to accommodate high boost pressures and axial or thrust loads acting on the compressor wheel 32 and transmitted to the turbocharger shaft 26 during normal operation of the turbocharger 10. A lubricant flinger 48 is mounted on the turbocharger shaft 26 adjacent the thrust bearing 46. The lubricant flinger 48 is sleeved to the turbocharger shaft 26 via a lubricant flinger sleeve 50 for rotation therewith, and includes a lubricant flinger wheel 52 that flings any lubricant beyond the thrust bearing 46 radially outward. As illustrated, the lubricant flinger sleeve 50 and the lubricant flinger wheel 52 are integrally formed together to create the lubricant flinger 48 as a single part or component. Situated between the compressor wheel 32 and the lubricant flinger 48 is a non-rotating thrust bearing insert or backplate 54 circumferentially secured within a backplate recess 56 of the bearing housing 20 and sealed with respect to the lubricant flinger 48 by an O-ring 58. The backplate 54 as illustrated is discussed in greater detail below, but those skilled in the art will understand that the backplate 54 and its features as described herein may be integrated into the compressor housing 20 as a single unitary component.

Those skilled in the art of turbochargers will appreciate that high-pressure oil or other lubricant enters a lubricant inlet 60. A portion of the lubricant travels through passages 62, 64 to the journal bearings 42, 44, respectively, while the balance of the lubricant travels through a passage 66 to the thrust bearing 46. As noted, the thrust bearing 46 must handle loads generated by the rotor group formed by the turbine wheel 24, the turbocharger shaft 26 and the compressor wheel 32 within the compressor housing 18. For this purpose, the turbocharger shaft 26 includes a shaft shoulder 68 supporting a thrust washer 70 that receives the thrust load of the thrust bearing 46. The lubricant flinger sleeve 50 and the thrust washer 70 form a collar around the thrust bearing 46 that is configured to receive thrust loads in both axial directions. Axially spaced piston rings 72 are radially interposed between the lubricant flinger sleeve 50 and the backplate 54 and configured to minimize travel of the high-pressure lubricant from a lubricant recirculation recess 74 of the backplate 54 to the interface between the backplate 54 and the compressor wheel 32. This arrangement is intended to achieve an ultimate goal of keeping the lubricant away from and out of the compressor housing 18.

A non-rotatable lubricant deflector 80 is axially secured to the bearing housing 20 between the backplate 54 and the backplate recess 56, and is disposed within the lubricant recirculation recess 74. The lubricant deflector 80 is configured to receive any lubricant that travels past the thrust bearing 46 and reaches the lubricant flinger 48. Although the amount of such lubricant is intended to be minimized, as controlled principally by tight tolerances, the rotating lubricant flinger 48 is configured to radially fling or impel such oil to the lubricant deflector 80 for its gravitational return to a lubricant core 82 of the bearing housing 20 and drainage through a lubricant drain 84 into an oil sump (not shown) of the engine. For this purpose, the lubricant deflector 80 includes a lubricant deflector tongue 86 that extends downward and is angled toward the lubricant core 82 to direct the flow of lubricant toward the lubricant drain 84.

Figure 2:
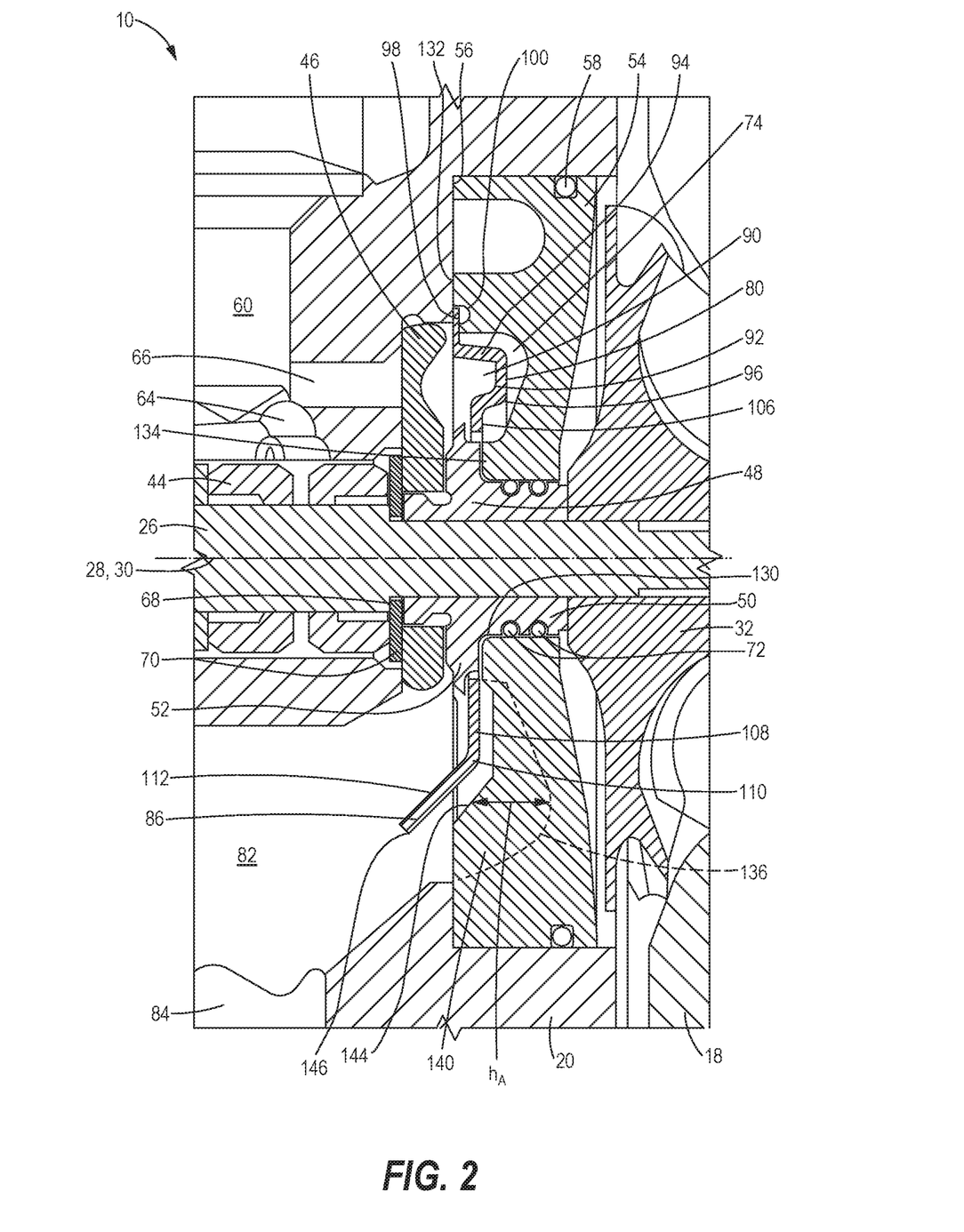
FIG. 2 is an enlarged side cross-sectional view of a portion of the turbocharger of FIG. 1 where a compressor housing is mounted to a bearing housing.

Referring now to FIG. 2, an enlarged portion 200 of FIG. 1 of the interface between the compressor housing 18 and the bearing housing 20 is illustrated and components such as the journal bearing 44, the thrust bearing 46, the lubricant flinger 48, the backplate 54, the thrust washer 70 and the lubricant deflector 80 are shown in greater detail. The lubricant flinger 48, the backplate 54 and the lubricant deflector 80 are configured to capture any lubricant passing the thrust bearing 46 and directing the captured lubricant to the to the lubricant drain 84 to substantially prevent the lubricant from entering the compressor housing 18. The lubricant deflector 80 is captured in the backplate recess 56 between the bearing housing 20 and the backplate 54. The backplate 54 is configured for receiving the lubricant deflector 80 there in and directing the captured lubricant to the lubricant core 82 is discussed further below.

Figure 3:
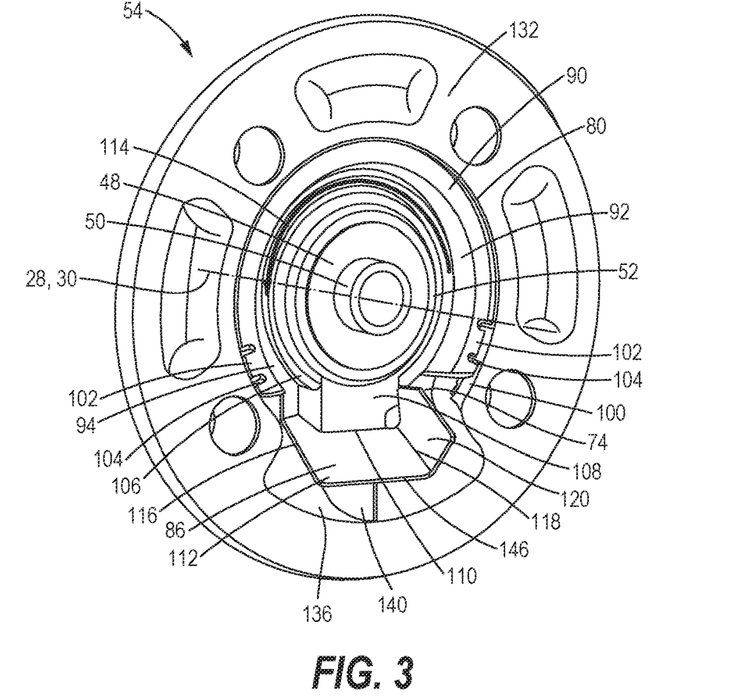
FIG. 3 is a partial assembly isometric view of a backplate, a lubricant flinger and a lubricant deflector in accordance with the present disclosure of the turbocharger of FIG. 1.
Figure 3A:
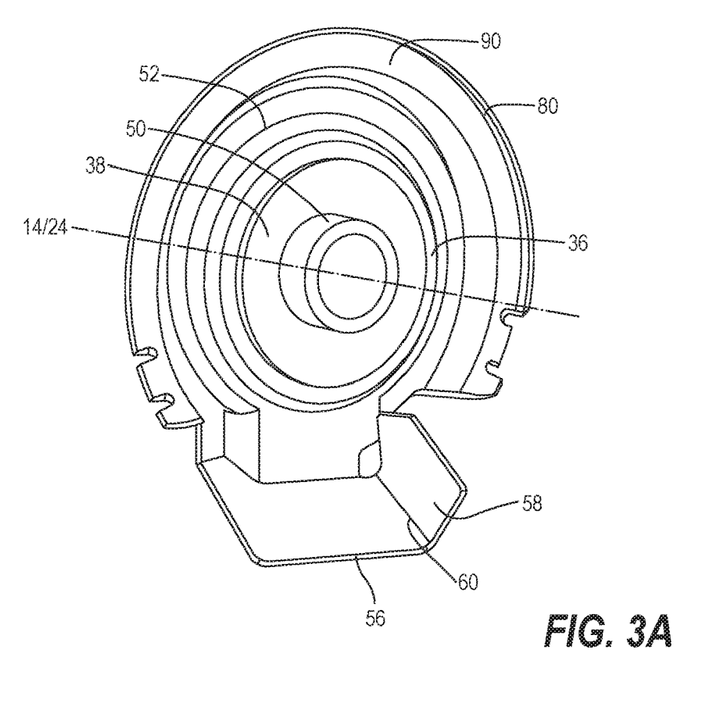
FIG. 3A is a partial assembly isometric view of a the lubricant deflector of FIG. 3, in accordance with the present disclosure.

The lubricant deflector 80 is shown in greater detail in FIGS. 2 and 3. FIG. 3A depicts aspects of the lubricant deflector 80 separated from the backplate 54. The lubricant deflector 80 defines an annular lubricant deflector channel 90 having a channel outer side wall 92, the channel inner side wall 94 and a channel back wall 96 connecting the channel sidewalls 92, 94. The lubricant deflector channel 90 opens toward the bearing housing 20 and the thrust bearing 46 when the lubricant deflector 80 is installed. As seen in FIG. 3, the lubricant deflector channel 90 extends circumferentially about the lubricant flinger 48 and the turbocharger shaft 26 greater than 180° but less than 360° so that the lubricant deflector channel 90 opens below the turbocharger shaft 26 of the lubricant flinger 48.

The lubricant deflector 80 further includes an outer flange 98 extending radially outward from the channel outer side wall 92. The outer flange 98 extends circumferentially about the lubricant flinger 48 to the extents of the lubricant deflector channel 90, and a received by a lubricant deflector receiving groove in the lubricant recirculation recess 74. As seen in FIG. 2, the outer flange 98 is captured between the lubricant deflector receiving groove 100 and the backplate recess 56 of the bearing housing 20 to substantially prevent flow of lubricant around the outer flange 98. The outer flange 98 may further include one or more alignment fingers 102 (FIG. 3) defined therein that are received by corresponding alignment notches 104 in the lubricant deflector receiving groove 100 and/or the lubricant recirculation recess 74 to align the lubricant deflector 80 and prevent rotation of the lubricant deflector 80 about the shaft rotational axis 28 and the turbocharger longitudinal axis 30.

The lubricant deflector 80 also includes an inner flange 106 extending radially inward from the channel inner side wall 94. The inner flange 106 may extends circumferentially to approximately 360° around the lubricant deflector 80. The inner flange 106 as shown has an inner flange inner diameter that is less than an outer diameter of the lubricant flinger wheel 52 so that the lubricant flinger wheel 52 and the inner flange 106 partially overlap and are axially juxtaposed. Despite the overlap, the inner flange 106 is axially and radially spaced from the lubricant flinger wheel 52 to allow the lubricant flinger 48 to freely rotate with the turbocharger shaft 26.

As mentioned above, the lubricant deflector channel 90 and the outer flange 98 extend less than 360° around the lubricant deflector 80 and terminate proximate a bottom of the lubricant deflector 80. This arrangement opens the lubricant deflector channel 90 to the lubricant core 82 when the lubricant deflector 80 is installed. At the bottom of the lubricant deflector 80, the lubricant deflector channel 90 and the inner flange 106 transition to the lubricant deflector tongue 86. The lubricant deflector tongue 86 has a tongue vertical wall 108 extending radially downward from the inner flange 106 to a tongue bend 110. A tongue body wall 112 extends radially downward from the tongue bend 110 and axially away from the channel back wall 96 so that the tongue body wall 112 is angled toward the lubricant core 82 when the lubricant deflector 80 is installed.

When the turbocharger shaft 26 and the lubricant flinger 48 rotate, lubricant flung into the lubricant deflector channel 90 will flow in the direction indicated by an arrow 114. Relative to the lubricant flow 114, the tongue body wall 112 includes an upstream lateral edge 116 and an oppositely disposed downstream lateral edge 118. At the downstream lateral edge 118, a tongue guard wall 120 extends outward from the tongue body wall 112 so that the tongue guard wall 120 extends into the lubricant flow 114 with this configuration, the tongue guard wall is positioned to engage the lubricant in the lubricant flow 114 and reduce the momentum of the lubricant flowing across the surface of the tongue vertical wall one and the tongue body wall 112. With the momentum produced, the lubricant is redirected downward over the surface of the tongue body wall 112 and into the lubricant core 82 to drain out the lubricant drain 84.

Figure 4:
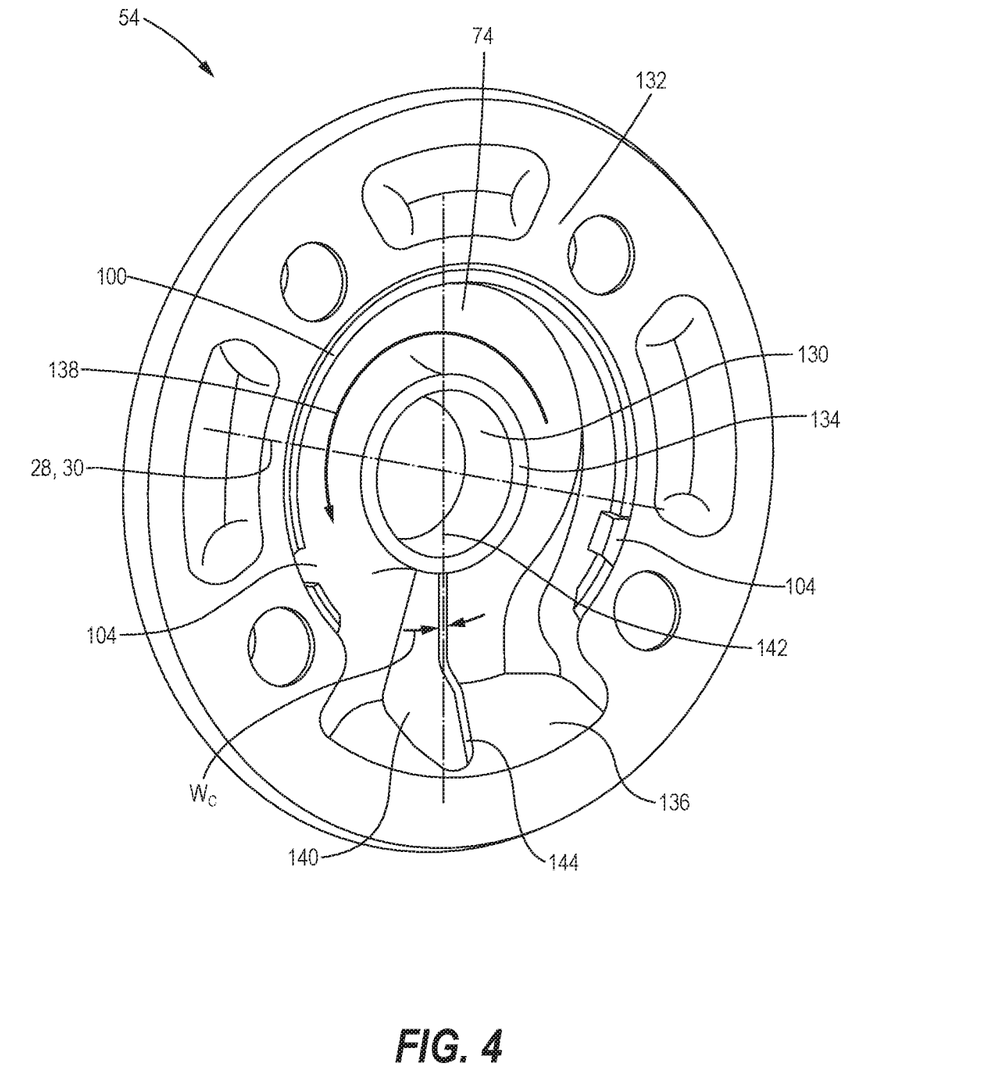
FIG. 4 is an isometric view of the backplate of FIG. 3.

Referring to FIG. 2 and to FIG. 4 that illustrates the backplate 54 in greater detail, the backplate 54 has a shaft opening 130 passing there through at the center. When the backplate 54 is installed, the shaft opening 130 is substantially concentrically aligned with the shaft rotational axis 28 and the turbocharger longitudinal axis 30. A bearing housing engagement surface 132 circumferentially surrounds the shaft opening 130. The bearing housing engagement surface 132 faces and engages the backplate recess 56 of the bearing housing 20 when the backplate 54 is installed. As discussed above, the outer flange 98 of the lubricant deflector 80 is captured between the backplate recess 56 and the lubricant deflector receiving groove 100. The flinger facing surface 134 around the shaft opening 130 is recessed from the bearing housing engagement surface 132 and faces the lubricant flinger wheel 52. The flinger facing surface 134 is spaced from the lubricant flinger wheel 52 to allow free rotation of the lubricant flinger 48, the turbocharger shaft 26 and the wheels 24, 32.

The lubricant recirculation recess 74 extends axially inward from the bearing housing engagement surface 132 and surrounds or encircles the shaft opening 130. The lubricant recirculation recess 74 has an axial depth that provides space for the lubricant deflector 80 to be disposed therein. The lubricant recirculation recess 74 will capture lubricant ejected by the lubricant flinger wheel 52 that is not captured by the lubricant deflector 80, such as lubricant passing through the gap between the lubricant flinger wheel 52 and the inner flange 106, and direct the lubricant to the lubricant core 82. The lubricant deflector receiving groove 100 is defined at a radial outer edge of the lubricant recirculation recess 74 to receive and engage the outer flange 98 of the lubricant deflector 80 as illustrated and described above.

Below the shaft opening 130, the lubricant recirculation recess 74 transitions into a lubricant collection recess 136. The lubricant collection recess 136 also extends axially inward from the bearing housing engagement surface 132, and extends radially or vertically downward from the shaft opening 130 and the lubricant recirculation recess 74. At a bottom end, the lubricant collection recess 136 intersects the bearing housing engagement surface 132 and is disposed proximate an intersection of the backplate recess 56 and the lubricant core 82. With this arrangement, the lubricant recirculation recess 74 and the lubricant collection recess 136 are placed in fluid communication with the lubricant core 82 and the lubricant drain 84. Lubricant within the lubricant recirculation recess 74 when the turbocharger shaft 26 and the lubricant flinger 48 are rotating may flow circumferentially in a direction indicated by an arrow 138 in FIG. 4, flow down into the lubricant collection recess 136 and drain into the lubricant core 82 and out the lubricant drain 84 to the oil sump.

The lubricant flow 138 into and through the lubricant collection recess 136 may be relatively uncontrolled, and may carry sufficient momentum to flow through the lubricant collection recess 136 and back through the lubricant recirculation recess 74. To stop the lubricant flow 138 and redirect the lubricant to the lubricant core 82 and the lubricant drain 84, additional flow control features are designed into the backplate 54. As illustrated in FIGS. 2 and 4, the backplate 54 further includes a lubricant stall protrusion 140 extending axially outward toward the bearing housing engagement surface 132 from the lubricant recirculation recess 74 and/or the lubricant collection recess 136. In this embodiment, a single lubricant stall protrusion 140 extends vertically downward beneath the shaft opening 130. All or a portion of the lubricant flowing in the lower portion of the lubricant recirculation recess 74 and in the lubricant collection recess 136 can impinge upon the lubricant stall protrusion 140. As the lubricant impinges upon the lubricant stall protrusion 140, energy is absorbed from the lubricant flow 138 and the momentum of the lubricant is reduced. The de-energized lubricant can then flow down the lubricant collection recess 136 and into the lubricant core 82.

The lubricant stall protrusion 140 can have any configuration necessary to slow and redirect the lubricant flow 138. In the illustrated embodiment, the lubricant stall protrusion 140 extends vertically downwardly below the shaft opening 130, and may lie along a vertical line 142 intersecting the shaft rotational axis 28 and turbocharger longitudinal axis 30. As the lubricant stall protrusion 140 extends downward, the lubricant stall protrusion 140 maintains an approximately constant circumferential width $w_C$ (FIG. 4). As best seen in FIG. 2, the lubricant stall protrusion 140 has a variable axial height $h_A$ that in part is dictated by the shape of the lubricant collection recess 136. As further illustrated, the axial height $h_A$ varies so that an outer protrusion edge 144 has a shape that is complimentary to a shape of the lubricant deflector tongue 86 to that a distance there between is approximately constant as the lubricant deflector tongue 86 and the outer protrusion edge 144 extend radially away from the turbocharger longitudinal axis 30. The lubricant stall protrusion 140 extends vertically downward beyond a bottom edge 146 (FIGS. 2 and 3) of the lubricant deflector tongue 86. In alternative embodiments, the lubricant stall protrusion 140 may extend downward only to the bottom edge 146 if necessary to create desired lubricant flow characteristics.

Figures 5, 7:
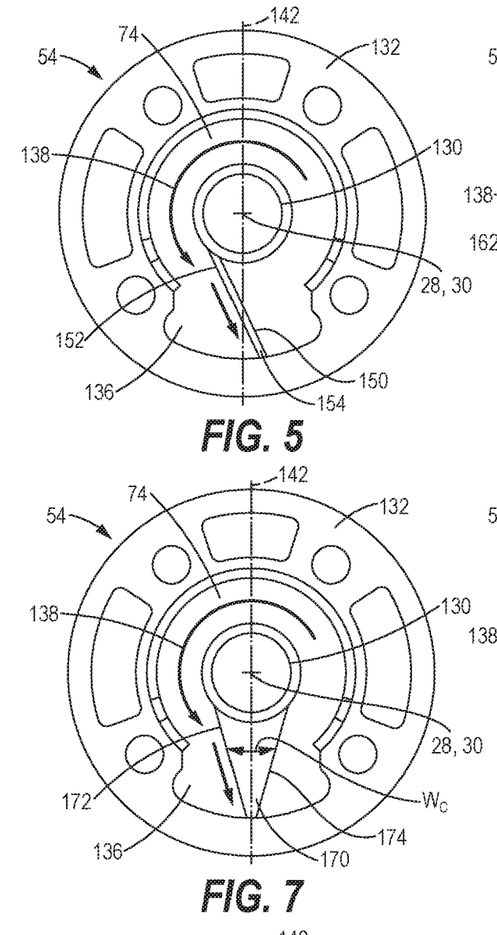
FIG. 5 is a plan view of an alternative embodiment of a backplate in accordance with the present disclosure.
FIG. 7 is a plan view of a further alternative embodiment of a backplate in accordance with the present disclosure.
Figures 6, 8:
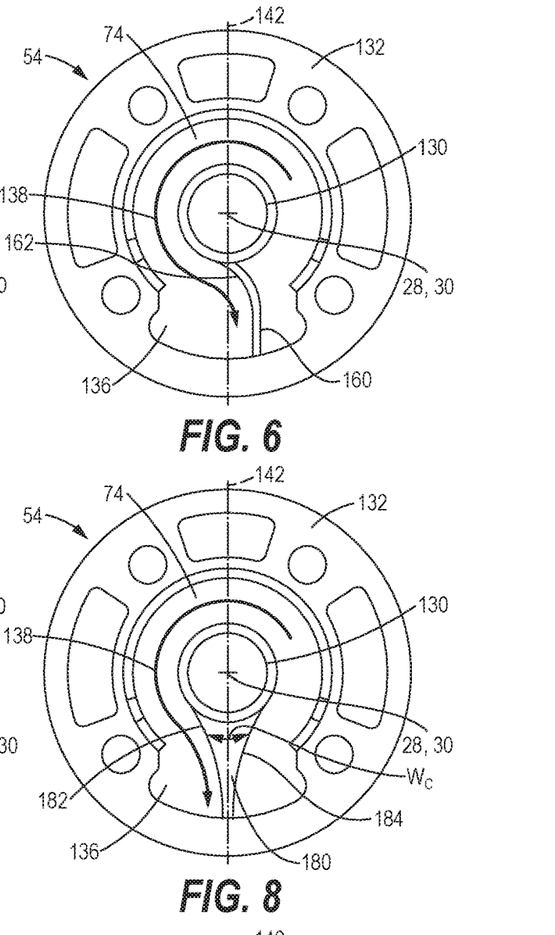
FIG. 6 is a plan view of another alternative embodiment of a backplate in accordance with the present disclosure.
FIG. 8 is a plan view of yet another alternative embodiment of a backplate in accordance with the present disclosure.

Alternative embodiments of lubricant stall protrusions in accordance with the present disclosure are contemplated by the inventors that may provide control and redirection of the lubricant flow 138 to drain lubricant leaking past the thrust bearing 46 and the lubricant deflector 80. Referring to FIG. 5, a lubricant stall protrusion 150 may be disposed below the shaft opening 130 but oriented at an angle with respect to the vertical line 142. As shown, an upstream end 152 of the lubricant stall protrusion 150 is positioned upstream into the lubricant flow 138 relative to the vertical line 142, and a downstream end 154 is positioned downstream of the vertical line 142. The angled lubricant stall protrusion 150 will engage and redirect the lubricant flow 138 to the lubricant core 82. The axial height $h_A$ may still be varied so that the outer protrusion edge 144 has a complimentary shape to the lubricant deflector tongue 86. FIG. 6 illustrates another alternative embodiment of a lubricant stall protrusion 160 having a curved shape with an upstream end 162 upstream relative to the vertical line 142. The curved shape of the lubricant stall protrusion 160 may function to convert the circumferential lubricant flow 138 into downward radial flow toward the lubricant core 82.

FIGS. 7 and 8 illustrate further alternative embodiments wherein the circumferential width $w_C$ of a lubricant stall protrusion can be varied to achieve desired fluid flow characteristics in redirecting and draining the lubricant in the lubricant flow 138. Referring to FIG. 7, the backplate 54 includes a lubricant stall protrusion 170 that may be symmetrical about the vertical line 142 and have the circumferential width $w_C$ decrease at a constant rate as the lubricant stall protrusion 170 extends radially outward away from the shaft opening 130 and toward the bearing housing engagement surface 132. An upstream side 172 of the lubricant stall protrusion 170 may present a similar surface to the lubricant flow 138 as the lubricant stall protrusion of FIG. 5 that will engage the lubricant flow 138 and redirect the lubricant downward toward the lubricant core 82. A downstream side 174 of the lubricant stall protrusion 170 is angled in the opposite direction as the upstream side 172 to give the lubricant stall protrusion 170 a generally wedge-shaped configuration.

FIG. 8 illustrates the backplate 54 having a lubricant stall protrusion 180 that is also symmetrical about the vertical line 142, but has the circumferential width $w_C$ decreasing at a decreasing rate as the lubricant stall protrusion 180 extends radially outward away from the shaft opening 130 and toward the bearing housing engagement surface 132. Due to the rate of change of the circumferential width $w_C$, an upstream side 182 of the lubricant stall protrusion 180 may present a curved surface to the lubricant flow 138 that may be similar to the lubricant stall protrusion 160 of FIG. 6 and provide a smooth transition from the circumferential flow about the lubricant recirculation recess 74 to the more radial flow toward the lubricant core 82. As illustrated, a downstream side 184 of the lubricant stall protrusion 180 is a mirror image of the upstream side 182 to give the lubricant stall protrusion 180 a generally wedge-shaped configuration. If the downstream sides 174, 184 of the lubricant stall protrusions 170, 180, respectively, have minimal effect on the lubricant flow 138, the downstream sides 174, 184 could be oriented substantially parallel to the vertical line 142 to minimize the circumferential width $w_C$ of the lubricant stall protrusions 170, 180 and potentially reduce the material costs and fabrication required to manufacture the backplates 54.

Figure 9:
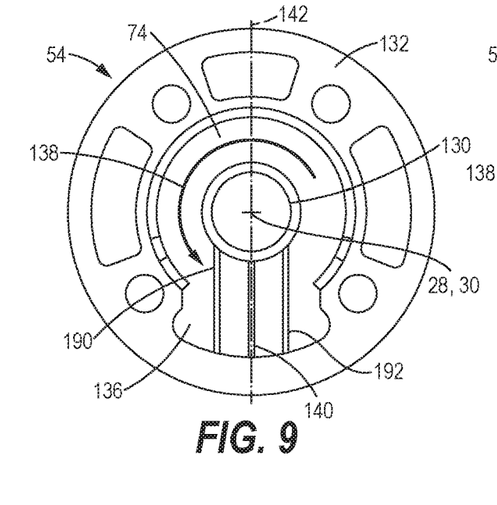
FIG. 9 is a plan view of an additional alternative embodiment of a backplate in accordance with the present disclosure.
Figure 10:
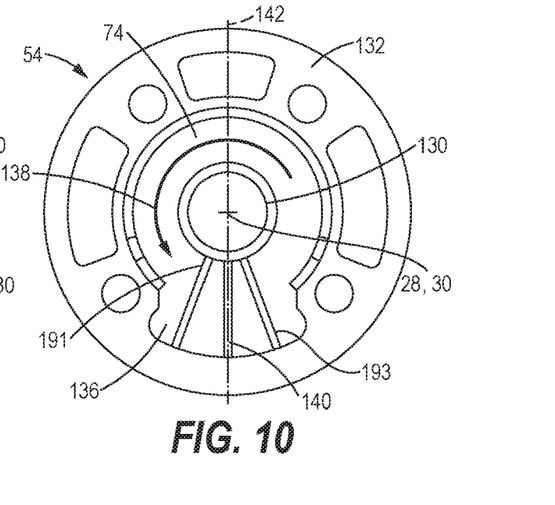
FIG. 10 is a plan view of another alternative embodiment of a backplate in accordance with the present disclosure.

In still further alternative embodiments, the position of lubricant stall protrusions along the lubricant flow 138 and a number of lubricant stall protrusions may be varied to achieve the desired lubricant flow characteristics and drainage. FIG. 9 illustrates the backplate 54 having the lubricant stall protrusion 140 as illustrated herein and described above along with an upstream lubricant stall protrusion 190 positioned upstream of the lubricant stall protrusion 140 and the vertical line 142 relative to the lubricant flow 138, and a downstream lubricant stall protrusion 192 positioned downstream of the lubricant stall protrusion 140. As illustrated in FIG. 9, the lubricant stall protrusions 140, 190, 192 are parallel to each other and extend substantially vertically downward from the shaft opening 130. Alternatively, FIG. 10 illustrates the backplate 54 with the lubricant stall protrusions 140, 191, 193 extending radially from the shaft opening 130 relative to the shaft rotational axis 28 and the longitudinal axis 30 such that their surfaces are perpendicular to the lubricant flow 138. The lubricant flow 138 is first engaged by the angled upstream lubricant stall protrusion 191 to redirect a portion of the lubricant toward the lubricant core 82. Any lubricant flowing past the angled upstream lubricant stall protrusion 191 is then engaged by the lubricant stall protrusion 140 to redirect at least a portion of the remainder of the lubricant toward the lubricant core 82. Any remaining lubricant flowing past the lubricant stall protrusion 140 is then engaged by the angled downstream lubricant stall protrusion 193 to ensure that substantially all lubricant is redirected to the lubricant core 82, and only an acceptable amount of lubricant may recirculate into the lubricant recirculation recess 74. In further alternative embodiments, one or two of the lubricant stall protrusions 140, 190, 192 or 140, 191, 193 can be omitted so that one or two are implemented to redirect the lubricant to the lubricant core 82.

INDUSTRIAL APPLICABILITY

During normal use of the turbocharger 10, exhaust gases from the engine act on the turbine wheel 24 to rotate the turbine wheel 24, the turbocharger shaft 26 and the compressor wheel about the shaft rotational axis 28. As the turbocharger shaft 26 rotates, pressurized lubricant from the passages 62, 64, 66 may leak past the thrust bearing 46 toward the compressor housing 18 and the backplate 54. The lubricant flinger wheel 52 rotating with the turbocharger shaft 26 engages the leaking lubricant and projects the lubricant radially outward into the lubricant deflector channel 90 of the lubricant deflector 80. The lubricant flows around the lubricant deflector channel 90 in the lubricant flow 114 until engaging the lubricant deflector tongue 86 and the tongue guard wall 120. The engagement absorbs energy from the lubricant flow 114 and reduces the momentum of the lubricant to allow gravity to redirect the lubricant downward over the surface of the lubricant deflector tongue 86 and into the lubricant core 82 of the bearing housing 20.

Due to the space provided by the lubricant deflector 80 to allow the lubricant flinger wheel 52 to freely rotate, some flow of lubricant into the recesses of the backplate 54 receiving the lubricant deflector 80 can occur. Control of the flow of the lubricant within the backplate 54 can prevent lubricant from leaking past the piston rings 72 and into the compressor housing 18. Lubricant flow 138 within the lubricant recirculation recess 74 of the backplate 54 can occur in the same direction as the lubricant flow 114 in the lubricant deflector channel 90. The lubricant stall protrusions 140, 150, 160, 170, 180, 190, 192 can be added and extend axially outward from the lubricant recirculation recess 74 and/or the lubricant collection recess 136 to engage the lubricant flow 138 and redirect the lubricant to the lubricant core 82. A particular lubricant stall protrusion implemented in the backplate 54 can have any appropriate configuration necessary to produce desired lubricant flow characteristics and redirect some or all of the lubricant to the lubricant core 82. For example, the lubricant stall protrusion 140 may have a shape that is complimentary to the lubricant deflector tongue 86 so that the outer protrusion edge 144 is disposed proximate the lubricant deflector tongue 86 and substantially all of the lubricant in the lubricant flow 138 is stopped by the lubricant stall protrusion 140 and redirected to the lubricant core 82. Moreover, in some implementations of the turbocharger 10, the lubricant deflector 80 may be omitted, and the lubricant recirculation recess 74, the lubricant collection recess 136 and the lubricant stall protrusions 140, 150, 160, 170, 180, 190, 192 may be configured to control the flow of the lubricant leaking past the thrust bearing 46 and redirect the lubricant to the lubricant core 82 and out through the lubricant drain 84. Additional alternative configurations and combinations of the components described herein are contemplated by the inventors as having use in turbochargers 10 in accordance with the present disclosure.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:
1. A turbocharger for receiving exhaust gas from an internal combustion engine and for delivering compressed air to the internal combustion engine, the turbocharger being lubricated by a lubricant, the turbocharger comprising:
   a compressor housing disposed about a longitudinal axis of the turbocharger and defining an inlet passage for receiving intake air;
   a bearing housing disposed about the longitudinal axis, wherein the bearing housing is coupled to the compressor housing and defines a lubricant core having a lubricant drain for collecting and draining the lubricant from the bearing housing;
   a turbocharger shaft extending through the compressor housing and the bearing housing and having a shaft rotational axis that is coincident with the longitudinal axis; and
   a backplate coupled between the compressor housing and the bearing housing, the backplate comprising:
      a shaft opening having the turbocharger shaft extending there through,
      a bearing housing engagement surface facing and engaging the bearing housing,
      a lubricant recirculation recess extending axially inward into the backplate from the bearing housing engagement surface, encircling the shaft opening, and in fluid communication with the lubricant drain, and a lubricant stall protrusion extending axially in a plane parallel with the longitudinal axis from the lubricant recirculation recess toward the bearing housing engagement surface, wherein the lubricant stall protrusion engages the lubricant flowing in a radial direction about the longitudinal axis in the lubricant recirculation recess such that the lubricant is redirected to the lubricant drain.

2. The turbocharger of claim 1, comprising a lubricant flinger having a lubricant flinger wheel disposed between the bearing housing and the backplate, and a lubricant flinger sleeve disposed on the turbocharger shaft and extending through the shaft opening, wherein the lubricant flinger impels the lubricant into the lubricant recirculation recess when the turbocharger operates and the turbocharger shaft rotates.

3. The turbocharger of claim 1, wherein a circumferential width of the lubricant stall protrusion is constant as the lubricant stall protrusion extends radially away from the shaft opening.

4. The turbocharger of claim 1, wherein a circumferential width of the lubricant stall protrusion decreases as the lubricant stall protrusion extends radially away from the shaft opening.

5. The turbocharger of claim 4, wherein the circumferential width of the lubricant stall protrusion decreases at a decreasing rate as the lubricant stall protrusion extends radially away from the shaft opening so that an upstream side of the lubricant stall protrusion has a curved surface that engages the lubricant flowing in the lubricant recirculation recess.

6. The turbocharger of claim 1, wherein the lubricant stall protrusion extends vertically downward beneath the shaft opening.

7. The turbocharger of claim 6, wherein the lubricant stall protrusion is circumferentially offset from a vertical line intersecting the longitudinal axis and upstream into a flow of the lubricant from the lubricant recirculation recess.

8. The turbocharger of claim 1, wherein the backplate comprises a lubricant collection recess extending axially inward from the bearing housing engagement surface and extending from the lubricant recirculation recess toward the lubricant drain, wherein the lubricant collection recess provides a fluid communication path from the lubricant recirculation recess to the lubricant drain.

9. The turbocharger of claim 8, wherein the lubricant stall protrusion extends into the lubricant collection recess.

10. The turbocharger of claim 1, wherein the backplate comprises a second lubricant stall protrusion extending from the lubricant recirculation recess toward the bearing housing engagement surface, wherein the second lubricant stall protrusion is circumferentially spaced from the lubricant stall protrusion, and wherein the second lubricant stall protrusion engages a portion of the lubricant flowing in the lubricant recirculation recess such that the lubricant is redirected to the lubricant drain.

11. A backplate for a turbocharger that receives exhaust gas from an internal combustion engine and delivers compressed air to the internal combustion engine, the turbocharger being lubricated by a lubricant and including a compressor housing defining an inlet passage for receiving intake air, a bearing housing coupled to the compressor housing and defining a lubricant core having a lubricant drain for collecting and draining the lubricant from the bearing housing, and a turbocharger shaft extending through the compressor housing and the bearing housing and having a shaft rotational axis that is coincident with a longitudinal axis of the bearing housing, wherein at installation the backplate is coupled between the compressor housing and the bearing housing, the backplate comprising:

a shaft opening having the turbocharger shaft extending there through, a bearing housing engagement surface that faces and engages the bearing housing when the backplate is installed in the turbocharger, a lubricant recirculation recess extending axially inward into the backplate from the bearing housing engagement surface and encircling the shaft opening, wherein the lubricant recirculation recess is in fluid communication with the lubricant drain when the backplate is installed in the turbocharger, and a lubricant stall protrusion extending axially in a plane parallel with the longitudinal axis from the lubricant recirculation recess toward the bearing housing engagement surface, wherein the lubricant stall protrusion engages the lubricant flowing in a radial direction about the longitudinal axis in the lubricant recirculation recess such that the lubricant is redirected to the lubricant drain.

12. The backplate of claim 11, comprises a lubricant collection recess extending axially inward from the bearing housing engagement surface and extending from the lubricant recirculation recess, wherein the lubricant collection recess provides a fluid communication path from the lubricant recirculation recess to the lubricant drain when the backplate is installed in the turbocharger.

13. The backplate of claim 11, wherein the lubricant stall protrusion is disposed vertically below the shaft opening when the backplate is installed in the turbocharger.

14. The backplate of claim 11, wherein the lubricant stall protrusion is circumferentially offset from a vertical line intersecting the longitudinal axis and upstream into a flow of the lubricant from the lubricant recirculation recess when the backplate is installed in the turbocharger.

15. The backplate of claim 11, wherein a circumferential width of the lubricant stall protrusion is constant as the lubricant stall protrusion extends radially away from the shaft opening.

16. The backplate of claim 11, wherein a circumferential width of the lubricant stall protrusion decreases as the lubricant stall protrusion extends radially away from the shaft opening.

17. A turbocharger for receiving exhaust gas from an internal combustion engine and for delivering compressed air to the internal combustion engine, the turbocharger being lubricated by a lubricant, the turbocharger comprising:

a compressor housing disposed about a longitudinal axis of the turbocharger and defining an inlet passage for receiving intake air;

a bearing housing disposed about the longitudinal axis, wherein the bearing housing is coupled to the compressor housing and defines a lubricant core having a lubricant drain for collecting and draining the lubricant from the bearing housing;

a turbocharger shaft extending through the compressor housing and the bearing housing and having a shaft rotational axis that is coincident with the longitudinal axis;

a backplate coupled between the compressor housing and the bearing housing, the backplate comprising:

a shaft opening having the turbocharger shaft extending there through, a bearing housing engagement surface facing and engaging the bearing housing, a lubricant recirculation recess extending axially inward into the backplate from the bearing housing engagement surface, encircling the shaft opening, and in fluid communication with the lubricant drain, and a lubricant stall protrusion extending axially in a plane parallel with the longitudinal axis from the lubricant recirculation recess toward the bearing housing engagement surface, wherein the lubricant stall protrusion engages the lubricant flowing in a radial direction about the longitudinal axis in the lubricant recirculation recess such that the lubricant is redirected to the lubricant drain; and a lubricant deflector coupled between the bearing housing and the backplate, the lubricant deflector comprising:

a lubricant deflector channel encircling the turbocharger shaft and the shaft opening and opening toward the bearing housing to receive the lubricant from the bearing housing, and a lubricant deflector tongue extending from the lubricant deflector channel toward the lubricant drain, wherein the lubricant deflector tongue engages the lubricant flowing in the lubricant deflector channel such that the lubricant is redirected to the lubricant drain.

18. The turbocharger of claim 17, wherein the lubricant stall protrusion and the lubricant deflector tongue are axially aligned relative to the shaft rotational axis.

19. The turbocharger of claim 17, wherein the lubricant stall protrusion extends toward the lubricant drain and past a bottom edge of the lubricant deflector tongue.

20. The turbocharger of claim 17, wherein the lubricant deflector tongue comprises a tongue guard wall extending outward from a downstream lateral edge of the lubricant deflector tongue relative a flow of the lubricant in the lubricant deflector channel and engaging the lubricant from the lubricant deflector channel to redirect the lubricant to the lubricant drain.

* * * * *